United States Patent [19]

Peppers

[11] 4,334,302
[45] Jun. 8, 1982

[54] FLEXIBLE RECORDING DISC STABILIZING AND GUIDANCE SYSTEM

[76] Inventor: James M. Peppers, 800 W. Main #102, Arlington, Tex. 76013

[21] Appl. No.: 155,536

[22] Filed: Jun. 2, 1980

[51] Int. Cl.³ .......................... G11B 5/52; G11B 5/82; G11B 25/04
[52] U.S. Cl. ...................... 369/261; 360/86; 360/99
[58] Field of Search ...................... 369/261; 360/86, 99

[56] References Cited

U.S. PATENT DOCUMENTS

| | | | |
|---|---|---|---|
| 3,863,266 | 1/1975 | Hoshino | 360/99 |
| 3,927,252 | 12/1975 | Polley | 269/261 |
| 4,051,529 | 9/1977 | Miyaoka | 369/112 |
| 4,058,834 | 11/1977 | Miyaoka | 369/219 |
| 4,060,248 | 11/1977 | Lakerveld et al. | 369/280 |
| 4,068,851 | 1/1978 | Yamamura | 369/261 |

FOREIGN PATENT DOCUMENTS 733007  5/1980  U.S.S.R. .............................. 369/261

Primary Examiner—Steven L. Stephan
Attorney, Agent, or Firm—James E. Bradley

[57] ABSTRACT

Discloses a system for stabilizing thin flexible foil recording discs (such as TV recordings) against axial fluctuation when rotated at high speeds (1500–5000 rpm). May include stationary guide plates formed and disposed to confine the rotating disc in such manner that the rotating disc pumps a uniform, radially moving and stabilizing layer of air outwardly between the rotating disc and each guide plate. May also include windows to optically scan the recording disc, as needed. Discloses alternate kinds of suitable recording discs.

29 Claims, 10 Drawing Figures

FLEXIBLE RECORDING DISC STABILIZING AND GUIDANCE SYSTEM

FIELD OF THE INVENTION

This invention generally pertains to apparatus for recording and playing thin flexible disc recordings and more particularly pertains to apparatus for closely guiding and stabilizing very thin recordings, such as photographic film recordings, which are rapidly rotating.

BACKGROUND OF THE INVENTION

Axial fluctuation in movement of a rotating recording disc during recording or playback, particularly the thin flexible sheet or foil type discs, presents a problem with the optical playback kind of machines. Electromechanical approaches to solving this problem are shown in U.S. Pat. Nos. 4,051,529 and 4,058,834, for example.

Apparatus for playing thin flexible foil recordings is shown in U.S. Pat. No. 4,060,248 as including a transparent adapter support disc which supports and rotates with the foil recording. Air admission apertures are shown near the hub of this support disc to admit air in between the rotating foil recording and the rotating planar face of the support disc. The air is disclosed to pass between the rotating adapter disc and the rotating recording, due to centrifugal force, to produce an air gap or spacer, of thickness of approximately 0.5 millimeter, so that dust particles cannot become trapped between the two discs.

U.S. Pat. No. 4,068,851 dicloses playback apparatus including a disc housing and positioning feature.

U.S. Pat. No. 3,927,252 shows a disc stabilizer system including two stabilizer blocks spacially related on either side of a video disc which create aerodynamic air forces between the disc and the blocks to balance the blocks between the disc and resilient biasing elements.

Air bearings, i.e., air utilized as the lubricant between relatively moving surfaces, are rather commonly known and utilized.

SUMMARY OF THE INVENTION

An object of the invention is to provide improved apparatus for guiding and stabilizing thin record discs against axial fluctuation when such discs are rapidly rotated during both recording and playback modes.

Another object of the invention is to provide improved apparatus specifically for recording and playing back the kind of record discs which are sufficiently thin and flexible enough to be closely rolled or folded for convenient shipping, marketing, and storage.

A further object of the invention is to provide improved apparatus for guiding and stabilizing record discs which are provided in discrete, easily stored and shipped radial segments to be separately installed for recording or playback, or with the radial segments joined to a common flexible hub which can be folded across to place the segments face to face.

As known in the art, and shown to a representative extent in the prior art referenced herein, the rotation of thin sheet or foil optical type recordings presents the problem of axial fluctuation of the disc which will distort the recorded signals during recording and/or playback.

It would seem that the incremental centrifugal force imposed on the rotating mass of the recording disc would cause the disc to be stretched and maintained in a plane exactly at 90° to its axis. However, in the actual rotation of such thin disc sheets, the sheet does axially fluctuate to some extent with such fluctuation being enough to cause optical aberration of the signal analog formed on the disc recording, either as being recorded or being retrieved.

It is postulated that the centrifugal forces brought by high speed rotation of a disc recording creates minute incremental strains in the fiber of the disc, both radially and circumferentially, which cause fluctuations including "standing" axial deformations in the rotating disc. Such deformation in part may be caused from influence of the air through which the disc is moving. Very high speed (VHS) photography may give more information about such fluctuation. In any event, the present invention will effectively remove any such axial distortion.

Also, when such thin sheet or foil recordings have been rolled or folded for storage or shipping, the fiber or structure of the sheet takes a "set" at the lines of rolling or folding, even at times to the extent of a wrinkle, or even a crease, when the record is spread out for playback. Within appropriate parameters of the mass, diameter, thickness, and strength of the sheet, along with the playback rotational speed of the recording disc, the present invention will also effectively eliminate such wrinkles by the force of air pressure, in addition to the radial and circumferential forces resolving from the centrifugal force, to the extent there will be no physical rubbing of a surface of the disc against a surface of the guiding apparatus.

Further, when the disc is provided in segments for more convenient packaging and storage as herein described, the rotating disc segments may have a tendency to fluctuate, particularly toward the leading radial edges, in a "fluttering" fashion which will cause playback of disc segments to be difficult or impossible without proper guidance and stabilization as provided by this invention.

Within the guiding apparatus of the present invention, there will always be a film of air between any moving surface of an appropriate disc recording and any stationary surface within the guiding apparatus.

DESCRIPTION OF A PREFERRED EMBODIMENT

Figure 1:
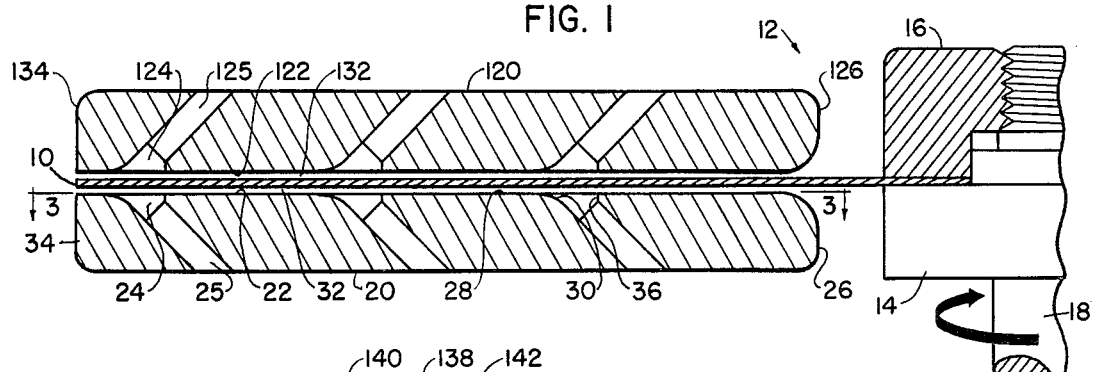
FIG. 1 is a schematic cross-sectional view of a disc record mounted within the stabilizing plates of the present invention.

FIG. 1 shows a record disc 10 received and mounted within the guiding and stabilizing apparatus 12 with the disc 10 being clamped, or chucked, onto a mounting hub 14 by a clamping nut 16 of a conventional recording or playback machine (not shown). The hub 14 is rotated by a drive shaft 18 rotated by the machine.

Figure 3:
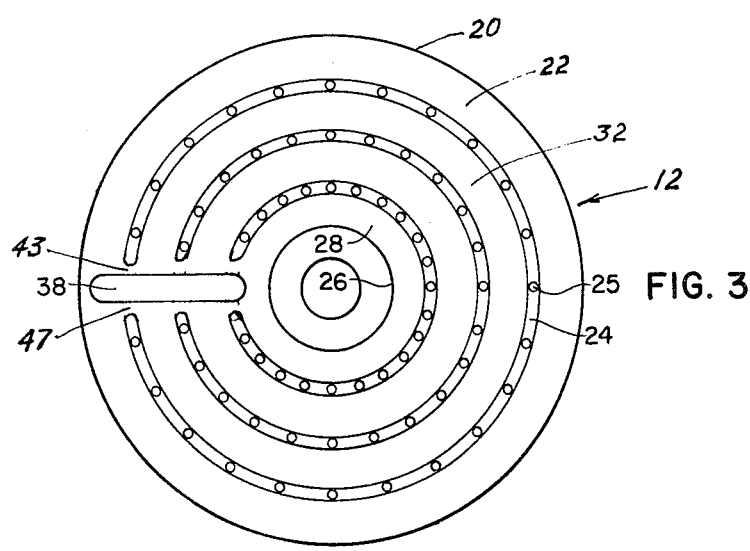
FIG. 3 is a plan view of one of the stabilizing plates taken at the line 3—3 of FIG. 2.

The apparatus 12 in FIGS. 1 and 3 includes a generally circular lower guide plate 20 and a corresponding upper guide plate 120. The guide face 22 of lower guide plate 20 which addresses the disc 12 is illustrated in FIG. 3 and, though not shown, the upper plate 120 has a corresponding guide face 122 addressing disc 12 which is a mirror image of face 22. The elements described for lower guide plate 20 are also provided for the upper plate 120 and are identified with the corresponding elements having the same numbers bearing a 100 prefix.

Defined in the face 22 are a plurality of concentrically disposed circular air distribution grooves 24 vented to atmosphere vents 25. The inner shoulder 26 of plate 20 and the outer edges of each groove 24 are merged into concentric segments 28 of the face 22 through bevels 30 to form, in conjunction with the corresponding shoulder 26, outer edges of each groove 24, segments 28 and bevels 30 of plate 120, the annular converging throats and surfaces of a consecutive plurality of radial air stabilizing nozzles 32 within which the record disc 10 is confined. The circular outer shoulder 34 of guide plate 20 and circular shoulders 36 at the inner edges of the grooves 24 are formed at about right angles (90°) to serve, in conjunction with the corresponding grooves 124 and shoulders 136 of plate 120, as abruptly terminating air exits for the nozzles 32. Such an abrupt exit tends to leave the exiting air stream to continue straight along rather than be diverged.

The full circular paths of nozzles 32 are interrupted by a radially extending scanning slot or window 38. The slot 38 may radially extend completely through the guide plate 20, or may extend from near its inner edge to near its outer edge as shown. The thickness of the plate 20 around the slot 38 may be reduced by a counter slot 40 as shown in FIG. 2 to permit closer proximity of optical scanning elements.

Figure 2:
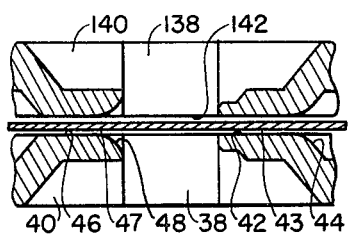
FIG. 2 is a cross-sectional view taken generally along lines 2—2 of FIG. 1 as rotated away from FIG. 1.

On assumption that the record disc 12 will be rotated counter clockwise, or from right to left as seen in FIG. 2, the grooves 24 are terminated and merged into a radial segment 42 of the face 22 through converging bevels 44, such that the segment 42, with its corresponding segment 142, form a stabilizing air throat and guide 43 for the record disc 12. The left side of the slot 38, as seen in FIG. 2, is merged into another radial segment 46 of the face 22 through a converging bevel 48 to form a stabilzing air throat and guide 47 for the record disc 10.

The faces 22 and 122 of the plates 20 and 120 are desirably provided as smooth surfaces, since the disc 10 will rub against one or both of these surfaces slightly as rotation begins and ends. The faces 22 and 122 of guide plates 20 and 120 are to be provided as very close to flat and parallel surfaces. The guide plates may be provided of metal, such as aluminum, or of a dimensionally stable plastic, such as polypropylene.

OPERATION

In operation of apparatus 12, the record disc 10 may be provided of a printed sheet, or of a developed photographic laminate such as shown and described with reference to FIGS. 5 and 8 or 9. Disc 10 is clamped or chucked into playing position with mounting hub 14. With very thin discs, it is best to bring the disc to playing speed in gradual fashion to avoid undue internal torque stress which can cause strain and consequent deformation of the disc 10 during startup.

It is anticipated that the rotational playing speed of the disc 10 may be in the order of from about 1500 rpm to more than 5000 rpm.

Though the surfaces of the disc 10 may be very smooth, even to a few Angstroms, there is some frictional engagement with the contacting air body. Thus, when the disc is rotated, some adjacent air is entrained and carried along to become subject to centrifugal force. The rotating disc 10 becomes, in effect, the impeller of a centrifugal air pump which forces a layer of air radially toward the outer periphery of the disc and, to some extent, circumferentially around the disc. As seen in FIGS. 1 and 2, the centrifugal force radially displaces the air through the nozzles 32 and 132 with air being forced by atmospheric pressure to feed into the nozzles through the converging throat bevels 30 and 130. The air velocity and the area over which the air passes of course increases incrementally toward the outer edge of the disc 10, requiring more air to maintain the same thickness of air layer through the successive nozzles 30 and 130. This additional air is supplied through the vents 25 and 125 and the air distribution grooves 24 and 124.

At the slot 38, the air moved tangentially through the nozzle 43 (established with the radial surface segment 42), is carried out the nozzle by the disc 10. Air also is moved tangentially into the nozzle 47 established by the throat bevel 48 and through the radial surface segment 46. Air is also brought in to nozzle 47 by atmospheric pressure as well as being carried along on the surface of the disc 10.

With the disc 10 rotating at playing (or recording) speed, it is seen that air in designated volume is being pumped by the disc 10 through the successive air nozzles 32. Such air volume is equally distributed in blankets or layers on each side of the disc 10 and forms a dynamic support of constant magnitude on each side of the disc which is substantially unchanging during rotation of the disc. When supported by these moving blankets of air, the disc 10 is in physical moving contact only with air and is permitted substantially no axial deviation (vertical deviation in FIG. 1).

Figure 2A:
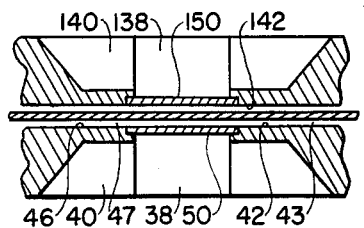
FIG. 2A is the same view as FIG. 2 but showing an alternate embodiment of the stabilizing plates of FIGS. 1 and 2.

FIG. 2A illustrates an alternate embodiment to the structure shown and previously described with reference to FIG. 2. As shown, the stabilizing air throat and guide 43 and 143, and also the stabilizing air throat and guide 47 and 147, of the guide plates 20 and 120 respectively, have been replaced by thin transparent windows 50 and 150 in the plates 20 and 120, respectively, which are inset so as to be flush with the guide faces 22 and 122. The windows 50 and 150 are preferably thin and may be provided of glass, Lucite, plexiglass, or acrylic, for example. The transparent material provided should have a low refractive index so as to introduce minimum distortion to light beams passing through the window. This alternate structure with windows may always be considered as desirable from the viewpoint of protecting the disc 10 and guide faces 20 and 120 from dust. Whether the windows are otherwise required will depend on the kind, thickness and flexibility of the disc 10 and the width of the scanning slot 38 and 138 as determined by trial.

Figure 6:
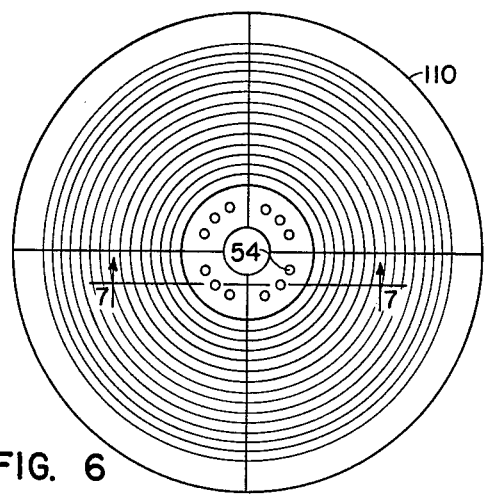
FIG. 6 is a plan view of a record disc provided to be folded into four radial segments.

If a segmented disc 110, as later described with respect to FIG. 6, is used in the device, there may be some flutter which could cause the leading edge of the segment to hang up in the slots 38 and 138. Any hanging or binding can be eliminated by employment of windows 50 and 150 as shown. It is considered, as a general condition, that the windows 50 and 150 will not be required, but their provision is disclosed for such situations where they may be needed.

Figure 4:
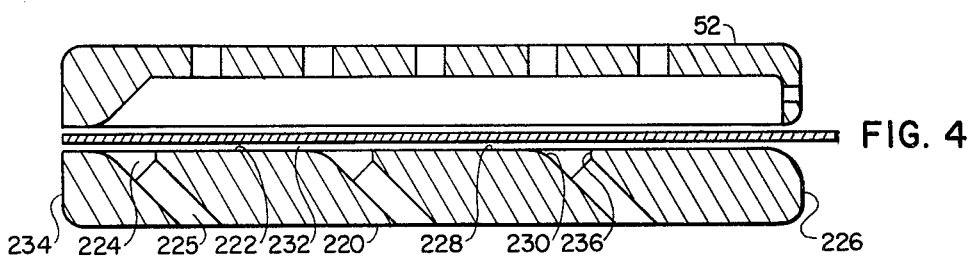
FIG. 4 shows an alternate embodiment of the stabilizing plates of FIGS. 1 and 2, or 2A, with a static air space provided on one side of the record disc.

FIG. 4 shows an alternate embodiment of the structure of FIG. 1 which of course may include the structure of FIGS. 2 or 2A as desired. As seen in FIG. 4, there is a lower guide plate 220 which may be identical in all respects to the guide plate 20 as shown in FIG. 1. Accordingly, the elements of the plate 220 are identified with the same numbers assigned to the plate 20 with the 200 prefix added.

The upper plate 120 as shown in FIG. 1, is replaced by a ventilated cover 52 in FIG. 4 which may terminate at its outer periphery with a stabilizing throat similar to the throat defined by the plate 120 of FIG. 1. The purpose of the ventilated cover 52 is to provide a relatively still body of air at atmospheric pressure above the disc 10. In operation, the disc 10 is rotated as previously described with reference to FIG. 1. The rotation of the disc 10 pumps air along its lower side as previously described, creating a blanket of air across the face 222 which is in rapid movement as previously described.

As is commonly known, when a foil such as an airplane wing has air moving on one side at a higher velocity than on the other side, a differential air pressure is formed and exerted across the foil toward the side having the more rapidly moving air. This is due to the fact that the air in movement exhibits less pressure than air which is either still or slower moving.

In FIG. 4, it is seen that the still body of air above the record disc 10 will be essentially quiet or slow moving while the air below the disc 10 will be moving very rapidly in a radial and somewhat circumferential fashion. Thus, a differential pressure is exerted across the disc 10, tending to hold the disc 10 firmly down against the supporting blanket of air moving radially outwardly between the disc 10 and the guide plate 220. The operation of this embodiment will produce stability and guidance for the disc 10 which is quite stable and quite satisfactory for scanning or recording.

It is to be noted, with respect to the structure disclosed in FIGS. 1-4, that the stabilizing plates and the ventilated cover are always fixed and immobile while the only moving part in the stabilizing combination is the disc 10. In operation, the disc 10 will have its attendant air pumping action when rotated within the confines of plate 20 and 120, or alternately, next to the plate 220 to be supported upon the supporting air layer next to the plate 220 by the relatively still body of air retained within the ventilated cover 52.

In FIG. 1, for example, rotation of either of the plates 20 or 120 would cause two problems. One problem is that there would be no method to optically scan through the moving plate. The other problem is that the pumping action of the disc 10 would be substantially diminished since there is no stable reference from which the molecular particles of air could be dispersed and guided uniformly. In contrast, and particularly with very flexible recording discs 10, air admitted through a hole near the hub of a plate which rotates with disc 10 would simply become a channel of air beneath the disc and extending from the body to the periphery of the disc. The air would not uniformly disperse as desired and provided by this invention.

It is further to be noted that the apparatus of the present invention is operable with the minimum provision of the guide plate 20, as described with reference to FIGS. 1 and 2, and without the guide plate 120. In this instance, the means urging the disc 10 against the air blanket uniformly dispersed over plate 20 is the ambient air only.

Figure 5:
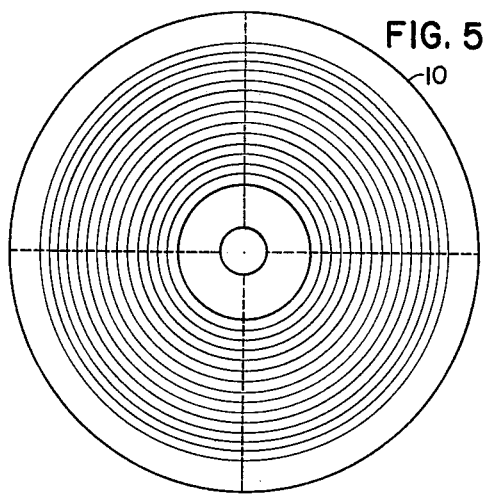
FIG. 5 is a plan view of a record disc provided in two radial segments.

Referring now to FIG. 5, there is shown a typical disc 10 suitable for use in the player 12 (partially shown in FIG. 1 or in FIG. 4). The dashed lines on the disc indicate lines where the disc typically could be folded as desired for storage or shipping. As shown, the disc 10 has a blank space near its center for the purpose of chucking the disc into the player. The disc 10 has an annular area of signal analog tracks which may be either spirally or concentrically formed. Near the outer edge of the record is another blank space where no recording is made. The tracks may be formed as previously mentioned and scanned either from the outside toward the center or vice versa. The record disc 10 may, for example, be about 30 centimeters in diameter with about 4000–6000 signal analog "tracks" formed on one or both sides of the disc. The annular play area may extend radially beginning at about 5 centimeters from the center of the disc to within about 2 centimeters from the periphery of the disc, for example.

It is believed that the present invention will be effective to stabilize a disc 10 of any thinness wherein the disc is provided of material having adequate optical properties and adequate dimensional stability at operational speeds of rotation.

When disc 10 is folded, sharp creasing may be avoided by folding the disc around a form as has been done for plastic belt recordings.

FIG. 6 shows a recording 110 which may be substantially the same as the record 10 shown in FIG. 5, but divided into respective segments. As shown, the respective segments may be mounted in alignment within the recording machine on guide mandrel pins (not shown) which are mounted through guide holes 54 in each of the record segments.

Figure 7:
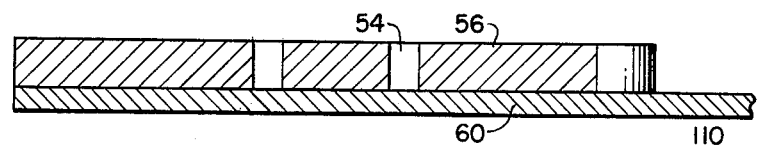
FIG. 7 is a cross-sectional view of the hub of the record taken at 7—7 of FIG. 6.

FIG. 7 shows record segments such as shown in FIG. 6 bonded at their center to a pliable hub member 56 so that the segments may be folded much as shown in disc 10 in FIG. 5, with the hub member holding together the respective record segments. In this instance it may be desirable to cut away a small portion of the adjacent edges of the respective record segments such as shown in FIG. 7 at 58 so that when the record segments are folded, as would be provided by the hub member 56, or if installed separately as anticipated in FIG. 6, the small clearance at 58 would facilitate folding, and also facilitate installation and removal of the segments from a player.

When the record segments of the record disc 110 are installed in a playing position as shown in FIG. 1, there could be an undesirable flutter as previously mentioned. If such flutter should occur when trying test records, then a window should be provided as shown in FIG, 2A in connection with FIG. 1, or with the embodiment shown in FIG. 4. Routine tests should be made to determine which expedient is the best from a cost and production viewpoint.

Figure 8:
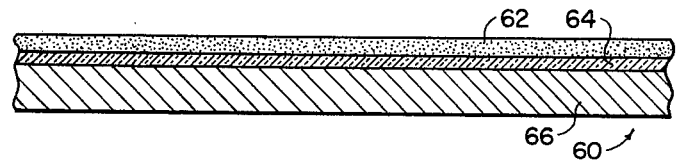
FIG. 8 is a cross-sectional view of a first photographic laminate suitable to be the record disc used in the present invention.

FIG. 8 illustrates an embodiment of recording disc laminate which is suitable for use in the record shown in FIGS. 5 and 6. As shown, the recording disc is formed of a photographic sheet 60 comprising a photosensitive emulsion layer 62 having one of its faces bonded to a reflective layer 64. The reflective layer may be bonded on its other face to a suitable material shown as substrate 66. The substrate 66 is to provide physical stability and strength to carry the emulsion layer and the reflective layer.

An exemplary film material for the emulsion layer is a fine grained silver alloy emulsion on the order of 6 microns in thickness. The substrate base may be provided of Mylar.

It is to be noted that some discs 10 may be partially transparent after photographic developing and will not include any reflective layer. It is further noted that some discs 10 may be sheets printed by other means than photographic development.

The reflective layer 64 may be of a highly reflective, thin metal foil which is laminated into the sheet material of the sheet 60 during manufacture. Also, the photographic film makers apply highly reflective metal through vapor deposition techniques, to a substrate such as shown, to deposit thin layers of highly reflective metal such as aluminum, gold, silver, chromium, and the like. The reflective layer need be no thicker than necessary for the reflective requirements of the machine. Example thicknesses of vapor deposition may be about 700-1200 Angstroms.

Figure 9:
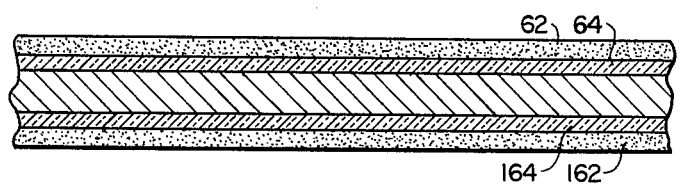
FIG. 9 is a cross-sectional view of a second photographic laminate suitable to be the record disc used in the present invention.

The film sheet 160 shown in FIG. 9 is essentially the same as in FIG. 8, but having another reflective layer 164 and a second photosensitive emulsion layer 162. In the embodiment of FIG. 9 the sheet 160 must be opaque, thus, either the substrate or the reflective layer should provide opaque properties.

From retrospective review of the embodiments herein disclosed, it will become apparent that variations and modifications may be made to such embodiments while remaining within the purview of the following claims.

I claim:

1. In apparatus for operating a thin flexible signal disc at high rotational speeds, a system for aligning and stabilizing the rotating disc into a substantially undeviating path, comprising:
   (a) a substantially annular stationary guide plate means defining a planar surface mounted parallel to one face of said rotating disc to provide a support and alignment reference for said disc;
   (b) said planar surface comprising a plurality of concentrically disposed planar radial air stabilizing means and a plurality of circular air distribution passage means disposed intermediate said stabilizing means and vented to atmosphere along the length of each said passage means:
   (c) each said air stabilizing means being of shape to serve as an air discharge nozzle means to direct passage of air radially out across said stabilizing means from said passage means as a substantially uniform air layer between said rotating disc and each said stabilizing means with the volume of said air increasing with additional air entering from each succeeding said passage means; and
   (d) air pressure urging means on the opposing side of said disc to uniformly urge said rotating disc into continued contact with said supporting air layer.

2. The apparatus of claim 1 wherein an open scanning window is defined through said guide plate means and radially disposed across a sufficient portion of said guide plate means to visually expose the signal recorded on said disc to optical scanning means provided with said apparatus.

3. The apparatus of claim 2 wherein said urging means comprises another said guide plate means disposed parallel to the opposite face of said disc to provide another said annular supporting air layer and to optically expose the signal portion of the opposite side of said disc.

4. The apparatus of claim 1 wherein said urging means comprises air ventilated means to maintain a relatively still air body contiguous to the opposite face of said disc, said still air body serving to impose atmospheric pressure across said disc against the less than atmospheric pressure exerted by said supporting air layer.

5. The apparatus of claim 4 wherein said ventilated means includes one said radial air discharge nozzle defined around the periphery of said disc to provide an annular supporting air layer functioning with a peripheral annular supporting air layer simultaneously provided on the opposite side of said disc by said guide plate means.

6. The apparatus of claim 2 wherein said guide plate means defines a radially extending air exit nozzle along one side of said scanning window and a radially extending air entry nozzle along the other side of said window.

7. The apparatus of claim 2 wherein said window is covered with a solid transparent plate.

8. The apparatus of claim 3 wherein both said windows are covered respectively with a solid transparent plate.

9. The apparatus of claim 4 wherein said ventilated means includes another said open scanning window disposed parallel to the opposite face of said disc to visually expose the signal portion of the opposite side of said disc.

10. The apparatus of claim 9 wherein said ventilated means defines a radially disposed air exit nozzle on one side of said scanning window and a radially disposed air entry nozzle on the other side of said window.

11. The apparatus of claim 9 wherein said window is covered with a solid transparent plate.

12. The apparatus of claim 6 wherein said rotating disc is comprised of a plurality of arcuate segments.

13. The apparatus of claim 7 wherein said rotating disc is comprised of a plurality of arcuate segments.

14. The apparatus of claim 8 wherein said rotating disc is comprised of a plurality of arcuate segments.

15. The apparatus of claim 2 wherein said rotating disc is provided of foldable material.

16. The apparatus of claim 3 wherein said rotating disc is provided of foldable material.

17. The apparatus of claim 4 wherein said rotating disc is provided of foldable material.

18. The apparatus of claim 1 including a thin flexible circular recording disc, suitable to be folded or tightly rolled as for shipping or storage and subsequently played at high rotational speed, comprising in combination:
   (a) a thin pliable plastic substrate;

(b) a thin flexible reflective layer having one side bonded to one side of said substrate; and (c) a photographic emulsion bonded to another side of said reflective layer.

19. The recording disc of claim 18 further including:

(a) a second thin reflective layer having one side bonded to another side of said substrate; and (b) a photographic emulsion bonded to another side of said second reflective layer.

20. The recording disc of claim 18 wherein said disc is provided in at least two arcuate segments.

21. The recording disc of claim 19 wherein said disc is provided in at least two arcuate segments.

22. The recording disc of claim 18 wherein said reflective layer is provided of a vapor deposited metal.

23. The recording disc of claim 19 wherein said reflective layer and said second reflective layer is respectively provided of a vapor deposited metal.

24. The recording disc of claim 18 wherein said reflective layer is provided as a thin metal laminate.

25. The recording of claim 19 wherein said reflective layer and said second reflective layer is respectively provided as a thin metal laminate.

26. The recording of claim 22 wherein said disc is provided in at least two arcuate segments.

27. The recording of claim 23 wherein said disc is provided in at least two arcuate segments.

28. The recording of claim 24 wherein said reflective layer is provided as a thin metal laminate.

29. The recording of claim 25 wherein said reflective layer and said second reflective layer is respectively provided as a thin metal laminate.

* * * * *